Patented Nov. 8, 1927.

1,648,143

UNITED STATES PATENT OFFICE.

HOWARD S. McQUAID, OF CLEVELAND, OHIO, ASSIGNOR TO THE GRASSELLI CHEMICAL COMPANY, OF CLEVELAND, OHIO, A CORPORATION OF OHIO.

PRODUCTION OF BARIUM SILICOFLUORIDE.

No Drawing. Application filed November 22, 1926. Serial No. 150,162.

The present invention relates to a process for manufacturing barium silico fluoride, and especially barium silico fluoride in a condition suitable for use as an insecticide, which is cheaper than has been available heretofore.

The principal value of this compound is due to its insecticidal properties and it is, therefore, essential that the process for its production yield a product having certain specific physical properties as well as the requisite chemical purity.

Prior to my invention, barium silico fluoride has been usually made by treating barium compounds such as barium sulfid or barium carbonate with hydrofluosilicic acid, the barium silico fluoride precipitate being recovered by filtration or an equivalent method. The production of barium silico fluoride by substituting sodium silico fluoride for hydrofluosilicic acid has been attempted. However, it has been found that treatment of barium sulfid or barium carbonate with sodium silico fluoride gave as a product not barium silico fluoride but a mixture of the fluorides of the sodium and barium, together with silica.

The present invention is based upon the discovery that barium silico fluoride may be precipitated by means of sodium silico fluoride provided the barium is supplied in the form of certain salts, such as barium chloride or barium acetate, of a non-alkaline or neutral character, and further, that by carrying out the precipitation in accordance with a particular procedure the barium silico fluoride obtained possesses physical properties which especially adapt it for use as an insecticide.

The reaction may be carried out in various ways, as for instance, by slurrying the sodium silico fluoride with a hot solution of a suitable barium compound. However, it has been found that a superior product is obtained by slowly adding the barium compound to a thin slurry of sodium silico fluoride. The reaction mixture is preferably agitated and maintained at the boiling point throughout the reaction. By this procedure the tendency of the barium silico fluoride to deposit on the particles of sodium silico fluoride is minimized and the precipitate obtained, after grinding, occupies a large volume and is well adapted for insecticidal purposes. The volume of the ground precipitate is in general increased by an increased dilution of the slurry, and by reducing the size of the batch. If desired, a protective colloid or a small quantity of aicd may be added to the slurry although such additions are not essential.

The barium compound must be of a non-alkaline character such as barium chloride or barium acetate and may be added either in the solid crystalline form or as a solution.

The following example is given as further illustrating my invention.

A thin slurry is prepared in a lead lined vessel of the following composition:

| | Pounds. |
|---|---|
| Sodium silico fluoride | 50 |
| Hot water | 850 |
| Concentrated hydrochloric acid, 35% | .5 |

To this slurry is added 67 lbs. of dry barium chloride crystals (about 3% excess) over a period of one hour, the mixture being agitated and maintained at the boiling point throughout the period. The precipitate is then filtered, washed free of chlorids, dried, and ground.

The volume of the ground product averages from 40 to 60 cu. in. per lb. and is fully as satisfactory both in its physical characteristics and chemical purity as the products made by the more expensive methods formerly used.

As stated, the barium compound is preferably added to a thin slurry of the sodium silicofluoride whereby the volume and insecticidal properties of the final product are improved. By the term "thin slurry" is meant a slurry containing not less than about 10 parts, and preferably from 15 to 20 parts, by weight of water, to 1 part by weight of sodium silicofluoride.

I claim:

1. A process for the manufacture of barium silico fluoride which comprises reacting sodium silico fluoride with a non-alkaline barium compound.

2. A process for the manufacture of barium silico fluoride which comprises adding a non-alkaline barium compound to a slurry of sodium silico fluoride, the sodium silico fluoride being maintained in excess throughout the reaction.

3. A process for the manufacture of barium silico fluoride which comprises adding a non-alkaline barium compound to a thin slurry of sodium silico fluoride, the sodium silico fluoride being maintained in excess throughout the reaction.

4. A process for the manufacture of barium silico fluoride suitable for use as an insecticide which comprises slowly adding a non-alkaline barium compound to a thin slurry of sodium silico fluoride under agitation and while maintaining the reaction mixture substantially at its boiling point.

5. A process for the manufacture of barium silico fluoride which comprises adding a non-alkaline barium compound to a slurry containing one part, by weight, of sodium silico fluoride to 15–20 parts of water, the sodium silico fluoride being maintained in excess throughout the reaction.

In testimony whereof, I affix my signature.

HOWARD S. McQUAID.